US007139679B1

(12) United States Patent
McGrew (10) Patent No.: US 7,139,679 B1
(45) Date of Patent: Nov. 21, 2006

(54) METHOD AND APPARATUS FOR CRYPTOGRAPHIC PROTECTION FROM DENIAL OF SERVICE ATTACKS

(75) Inventor: David McGrew, Poolesville, MD (US)

(73) Assignee: Cisco Technology, Inc., San Jose, CA (US)

( * ) Notice: Subject to any disclaimer, the term of this patent is extended or adjusted under 35 U.S.C. 154(b) by 647 days.

(21) Appl. No.: 10/185,159

(22) Filed: Jun. 27, 2002

(51) Int. Cl.
*G06F 15/00* (2006.01)
(52) U.S. Cl. .................................... 702/186; 709/227
(58) Field of Classification Search ................ 702/186, 702/182–185; 713/201, 202, 150, 153; 709/225–227, 709/229, 235; 717/124
See application file for complete search history.

(56) References Cited

U.S. PATENT DOCUMENTS 6,834,310 B1 * 12/2004 Munger et al. ............. 709/232

OTHER PUBLICATIONS

A. Juels et al., "Client Puzzles: A Cryptographic Countermeasure Against Connection Depletion Attacks," in S. Kent, editor, *Proceedings of NDSS '99 (Networks and Distributed Security Systems)*, pp. 151-165, 1999.

D. Dean et al., "Using Client Puzzles to Protect TLS," 10th Annual USENIX Security Symposium, 2001.
S. Kent et al., "Security Architecture for the Internet Protocol," IETF RFC 2401, Nov. 1998, pp. 1-66.
Cisco Systems, Inc., "IPSec," Jan. 1997, pp. 1-10.

* cited by examiner

*Primary Examiner*—Edward Raymond
(74) *Attorney, Agent, or Firm*—Hickman Palermo Truong & Becker LLP (57) ABSTRACT

A method and apparatus for protecting, from denial of service attacks, a device that provides particular services that consume substantial computational resources. A data packet is received that includes data for the particular services and a cryptographic tag. It is determined whether the data packet is legitimate based on the cryptographic tag without using the data for the particular services. If it is determined that the data packet is not legitimate, then the data is diverted from input to the particular services that process the data. These techniques use the cryptographic tag to provide strong data origin authentication without the heavy computational costs associated with providing full data integrity authentication in typical cryptographic services. Further, denial of service protection is conveniently implemented as a cryptographic service.

44 Claims, 7 Drawing Sheets

METHOD AND APPARATUS FOR CRYPTOGRAPHIC PROTECTION FROM DENIAL OF SERVICE ATTACKS

FIELD OF THE INVENTION

The present invention generally relates to providing computationally resource-intensive services, such as cryptographic services, over a network. The invention relates more specifically to techniques for protecting devices providing such intensive services from denial of service (DoS) attacks.

BACKGROUND OF THE INVENTION

Network cryptographic services are provided by network devices to secure the secrecy, authenticity, integrity, or some combination of these properties, for messages sent over a network between communicating parties. The challenges of providing network cryptographic services are increased when the network includes components or users not trusted by the communicating parties. The Internet is a widely used network that includes components and users not trusted for secure communications.

Several cryptographic protocols have been developed for providing cryptographic services for messages transmitted over networks, such as the Internet, with non-trusted components and users. For example, an IPsec protocol has been promulgated to support virtual private networks (VPNs) on the Internet. IPsec is an open standard protocol for secure data transfer over the Internet as described in Request For Comments (RFC) 2401, among others, available at the time of this writing on the World Wide Web (www) at domain ietf.org.

A cryptographic protocol typically involves transforming "plaintext," understandable by anyone using public information, into an encrypted message, also called "ciphertext." As used here, plaintext includes data in data formats used by commercial software. The sender encrypts the plaintext with an encryption algorithm to generate the ciphertext. The ciphertext is not practically interpreted by anyone except the intended recipient. The interpretation by the intended recipient is usually accomplished using a secret shared with the sender, such as a long integer called a "key."

The cryptographic protocol includes, in a data packet, the ciphertext along with a cryptographic header portion that describes parameters of the cryptographic protocol. The data packet is transferred over the network using a standard network protocol. For example, the packet is transferred using the Internet Protocol (IP). Anyone on the network can determine the network address that originated the packet and the address of the intended recipient from the IP packet, and can even determine the cryptographic protocol being used from the cryptographic header portion. However, no one but the intended recipient can determine the plaintext from the ciphertext in a practical period of time. The recipient can decrypt the message using a decryption algorithm and the secret.

In some protocols, a successful decryption ensures that the data has not been modified or that the source of the message is authentic or both. For example, an IPsec packet includes an IPsec header, a first ciphertext section of variable length containing the data being sent and the transport protocol identifying the process to receive the data, and a second section of fixed length, called a message authentication code (MAC). When the MAC is verified, it is determined that the message originated at an authentic source and has not been altered. A MAC can be formed using a pseudorandom hash function and a secret key. The MAC in the second ciphertext section is verified if it equals the value obtained by inputting the first ciphertext section into the hash function and adding the secret key known only to the sender and receiver. A verified MAC indicates both that the data has not been modified (data integrity authentication) and that the sender is the source of the data (origin authentication).

In many systems, a trusted network device, such as a trusted router or trusted gateway server, on or near the boundary with a non-trusted portion of the network, performs the encryption and decryption for the security protocol. In such systems, unencrypted messages are included in data packets sent along trusted portions of the network.

A property of many cryptographic protocols is that the encryption algorithms or the decryption/verification algorithms, or both, consume considerable amounts of computational resources, including processing cycles and computer memory. Consequently, many such algorithms are implemented in circuitry that works on large numbers of binary digits (bits) at each clock cycle. Even so, the execution of the encryption and decryption circuits can limit the throughput (bits of plaintext transferred per second) of the network device providing the cryptographic service.

Cryptographic protocols are vulnerable to denial of service (DoS) attacks. A DoS attack is one in which a deluge of unwanted network traffic is directed at a particular network device, the "victim," in an attempt to overwhelm the victim's computational resources and render the victim incapable of performing its normal functions. DoS attacks are a serious threat on the Internet due to the difficulty in tracing such attacks and due to the abundance of non-trusted hosts, which can be subverted and used without the knowledge of the hosts' operators. An influx of spurious messages claiming to be utilizing a cryptographic protocol can be generated by several subverted hosts. The spurious messages consume much of a victim's computational resources to perform the decryptions, only to determine that each message is not sensible, or has been tampered with, or is not from an authentic source. Legitimate messages from a sender may be boxed out from being processed by the victim; that is, the cryptographic service offered by the victim has been denied to the user of the service, the legitimate sender.

For example, a large number of spurious IPsec messages each with a reasonable IPsec header and great length can be generated by subverted hosts. The victim does not detect that any message is spurious until the MAC block fails to be verified. Attempting to verify the MAC consumes resources that increase with the length of the first ciphertext section. The network device providing the IPsec service becomes overwhelmed and might not respond to every legitimate IPsec message. Thus, a denial of service occurs.

One approach to protecting a network device from a DoS attack is to trace and track the spurious messages to determine the sources of the spurious messages, and then to filter out data packets from those sources. However, such an approach does not prevent the DoS attack but merely reacts to the attack after the DoS has occurred. Thus, tracing and tracking does not provide any guarantee for the availability of the cryptographic service.

Another approach is to force each sender to perform a significant amount of work for each message sent. For example, a client puzzle method proposed by RSA Data Security, Inc. defines a keyless challenge-and-response mechanism for the Transport Control Protocol (TCP) in client/server communications. This approach discourages a potential attacker from generating enough messages to swamp the victim. However, this approach uses a collision-resistant hash function on the challenge and response messages. The use of the collision-resistant hash is approximately as computationally intense as employing the MAC verification procedure that is already part of many conventional cryptographic protocols.

Based on the foregoing, there is a clear need for protection against DoS attacks aimed at cryptographic services, which protection is less computationally intense than verifying a message authentication code.

In general, there is a need for protection against DoS attacks aimed at resource intensive services, which protection is less resource intensive than performing the services.

SUMMARY OF THE INVENTION

The foregoing needs, and other needs and objects that will become apparent from the following description, are achieved in the present invention, which comprises, in one aspect, a method for protecting from denial of service attacks a device that provides particular services that consume substantial computational resources. The method includes receiving a data packet that includes data for the particular services and a cryptographic tag. It is determined whether the data packet is legitimate based on the cryptographic tag without using the data for the particular services. If it is determined that the data packet is not legitimate, then the data is diverted from input to the particular services that process the data.

In another aspect of the invention, a method includes generating data for the particular services at a sending device that sends legitimate data packets. The sending device also generates a cryptographic tag independent of the data for the particular services. The cryptographic tag indicates to the device a legitimate data packet for the particular services. The sending device sends to the device a data packet that includes the data for the particular services and the cryptographic tag.

In other aspects, the invention encompasses an apparatus and a computer readable medium including a carrier wave configured to carry out the foregoing steps.

These techniques use the cryptographic tag to provide strong data origin authentication without the heavy computational costs associated with providing full data integrity authentication in typical cryptographic services.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENT

A method and apparatus for protecting against denial of service (DoS) attacks is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Operational Context

To illustrate the protection of computational resource-intensive services provided over a network from DoS attacks, it is assumed that data packets encrypted for a virtual private network (VPN) are transmitted over a public network. In particular, an Encapsulating Security Payload (ESP) protocol for sending ciphertext in an Internet Protocol (IP) message is described. However, the invention is not limited to this context. For example, the invention may also be applied to protect routers from DoS attacks that use router protocols. The invention may also be applied to protect systems using the Transport Control Protocol (TCP) with the MD5 authentication option from consuming all memory during memory allocation because of a DoS attack, and from a SYN flood—an excess number of TCP SYN messages. Further, the terms "computational cost" and "computational resources" as used herein include the concepts of storage cost and storage resources. Thus, the techniques described herein also may be used to protect storage.

Figure 1:
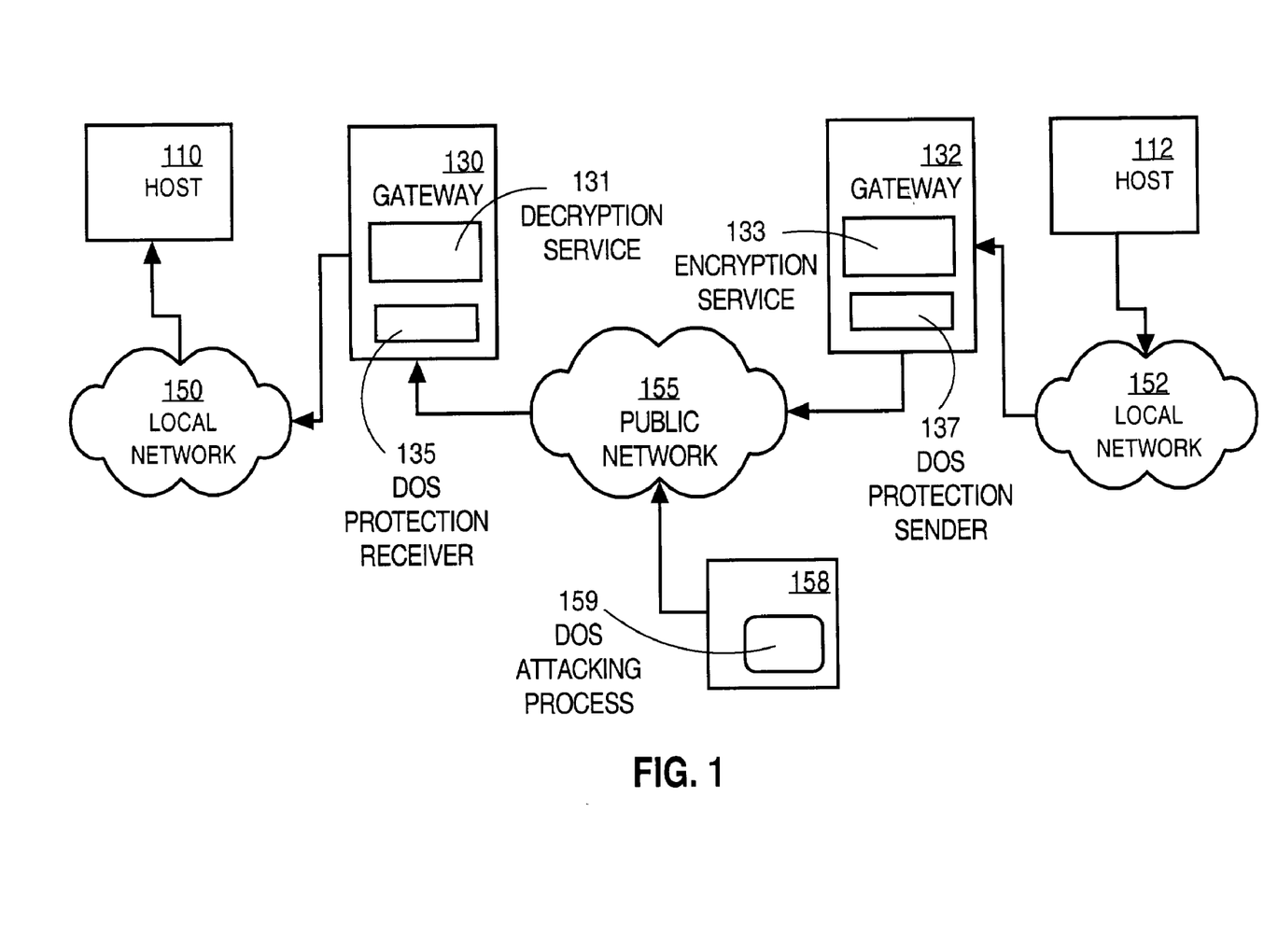
FIG. 1 is a block diagram that illustrates an overview of a decryption service for a network, which is protected against denial of service attacks.

FIG. 1 is a block diagram that illustrates an overview of a decryption service for a network, which is protected against denial of service attacks according to an embodiment.

A trusted local network 150 is connected to one or more hosts, such as host 110, and to a gateway 130 at a boundary with an un-trusted public network 155. In some embodiments, the gateway 130 is a host computer serving only to provide a service; in some embodiments, the gateway device is a computing device configured to direct network traffic, such as a router. A decryption service 131 is included in the gateway device 130. The decryption service 131 may be implemented in software or hardware, but is typically implemented in hardware for increased speed of performance. The decryption service 131 processes ciphertext, such as VPN payloads, received in network traffic from the public network 155. The decryption service 131 forms plaintext based on the VPN payloads and forwards the plaintext as messages in network traffic passed over trusted local network 150, such as to host 110.

The ciphertext in a VPN payload is generated at a second gateway 132 at the boundary between the public network 155 and a second trusted local network 152. An encryption service 133 is included in the gateway device 132. The encryption service 133 may be implemented in software or hardware, but is typically implemented in hardware for increased speed of performance. The encryption service 133 processes plaintext received from a host, such as host 112, on the second trusted local network 152. The encryption service 133 forms the ciphertext for the VPN payloads, and forwards the data packets with VPN payloads over the public network 155 to the gateway 130.

Each gateway device that handles two-way traffic includes both a decryption service and an encryption service, sometimes implemented in the same hardware. In some embodiments, either or both trusted local networks 150, 152 may consist of a simple connection to a single host, such as host 110, 112 respectively. In some embodiments, the trusted host 110 and trusted local network 150 are absent, and the gateway device 130 is the only trusted device.

In the embodiment depicted in FIG. 1, a DoS attack is initiated by a DoS attacking process 159 on a host 158 that is connected, directly or indirectly, to the public network 155. The DoS attacking process 159 causes a sufficient amount of spurious data packets to arrive at gateway 130 so that decryption service 131 is unable to efficiently process some or all of the legitimate traffic coming from trusted sources, such as gateway 132. The spurious data packets claim to involve the decryption service 131. During processing of each spurious message by the decryption service 131, it is determined that the data packet does not contain valid plaintext.

Structural Overview

Referring again to FIG. 1, the gateway 132 with the encryption service 133 includes a DoS protection sender 137, which is a process that inserts, into a data packet, a cryptographic DoS protection (CDP) tag that indicates for a DoS receiver 135 that the data packet is legitimate. The DoS sender 137 may be implemented in hardware or software or a combination of both hardware and software. Though shown as a separate service in FIG. 1, in other embodiments, the DoS protection sender 137 is part of the encryption service 133.

The gateway 130 with the decryption service 131 includes the DoS protection receiver 135, which is a process that determines whether a packet is legitimate based on the CDP tag before the packet is sent to the decryption service 131. The DoS protection receiver 135 may be implemented in hardware or software or a combination of both hardware and software. Though shown as a separate service in FIG. 1, in other embodiments, the DoS protection receiver 135 is included within the decryption service 131. The DoS sender 137 and DoS receiver 135 are described in more detail in later sections.

Although the DoS protection receiver 135 is shown in FIG. 1 on the same device 130 as the decryption service 131, in other embodiments, the DoS protection receiver 135 may reside on a different device.

As used herein, DoS attacks include tag capturing attacks in which a network device in network 155, on a path followed by data packets from gateway 132 to gateway 130, copies a CDP tag from a legitimate data packet and uses the captured tag in a spurious message sent to gateway 130. However, tag-capturing attacks constitute a less dangerous threat than DoS attacks initiated at host 158. The rate of tag production is limited to the rate at which the sender generates legitimate tags. The attacker can be traced readily because the attacking device is on the route followed by the packet. The attacker is unlikely to be able to create a flood because the attacker has limited computational capacity. Also, the attack appears to the sender, such as gateway 132, to be network congestion in which messages sent are not getting through. Conventional congestion control dictates that when congestion is sensed on the network, the sender should slow ("throttle back") the transmission of data packets. Such throttling back starves the attacker of tags that can be used in the attack.

CDP Tag

Figure 2:
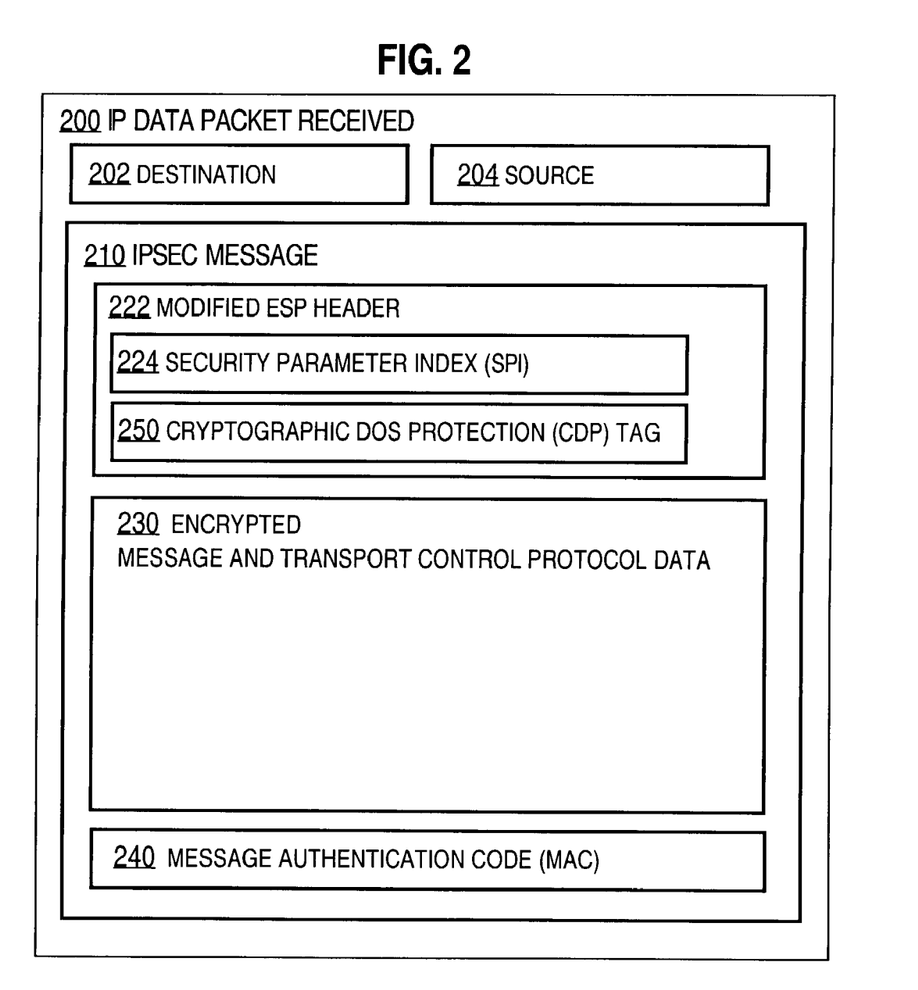
FIG. 2 is a block diagram that illustrates a data packet including data for a network decryption service and a tag utilized for protection against denial of service attacks.

FIG. 2 is a block diagram that illustrates an IP data packet 200 including data for a network decryption service and a CDP tag utilized for protection against denial of service attacks, according to an embodiment. It is assumed for purposes of illustration that a data packet with a VPN payload based on plaintext from host 112 is sent for host 110.

The IP portion of the data packet includes a destination field 202 that holds data indicating a network address for the device to which the data packet is directed. The IP portion of the data packet also includes a source field 202 that holds data indicating a network address for the device from which the data packet was sent. In the illustrated example, the destination field 202 includes data indicating the network address of host 110, and the source field 204 includes data indicating the network address of host 112.

The IPsec portion of the data packet 200 includes a header portion that holds data indicating values of parameters for the particular security protocol being used and a payload portion that holds a cryptographic payload. The ESP protocol uses an ESP header in the IPsec header portion, and includes in the IPsec payload portion both an encrypted data payload portion 230 and a message authentication code (MAC) portion 240.

According to the ESP protocol, the encrypted data payload portion 230 holds variable-length ciphertext. The variable length ciphertext results from encrypting a TCP portion that holds information for the transport control for the data packet and the data provided by the source (such as the device indicated by its network address in field 204).

The ESP header includes a security parameter index (SPI) field 224 and a sequence number field. The SPI field 224 serves as an index into a table data structure, which holds data that indicates that the ESP protocol is being used and which indicates the lengths of the two portions 230, 240 of the payload, among other information.

According to embodiments of the invention, the data packet 200 includes a CDP tag field holding data representing a value of a CDP tag. The value of the CDP tag indicates whether a data packet is legitimate and should be processed by the resource intensive services, such as the decryption services 131. The formation and use of the CDP tags in several embodiments are described in more detail in the following sections.

In the illustrated embodiment, a modified ESP header 222 replaces a conventional ESP header. The modified ESP header 222 includes the CDP tag 250 in place of the sequence number field of a conventional ESP header.

In some embodiments, the modified ESP header 222 includes values in the SPI field that indicate the message includes a CDP for DoS protection, but that the message does not include a payload to undergo MAC verification or decryption. A protocol using a modified ESP header for DoS protection but not for payload decryption is called an "ESP-light"protocol.

Functional Overview

A CDP tag is generated for each packet from a sending device. A recipient can verify the CDP tag using a secret shared by the sending device and the recipient. The recipient drops all packets that do not contain a proper value for the CDP tag. Each shared secret provides a sequence of tags.

The sequence of tags is practically unpredictable by an attacker who does not share the secret. Thus, a potential DoS attacker is limited to attempting to reuse tags that have already been sent. This limits the rate at which spurious packets can be generated by an attacker to the rate at which legitimate packets are generated.

Figure 3A:
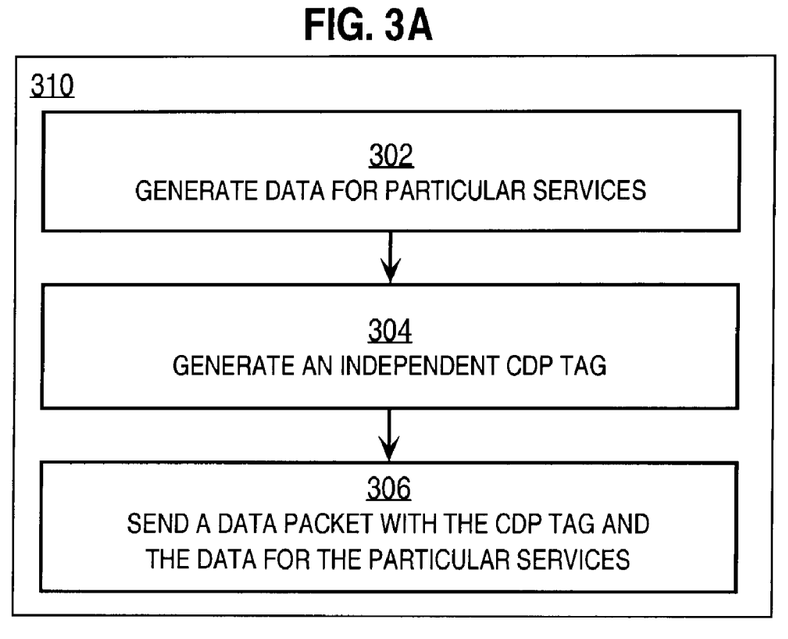
FIG. 3A is a flowchart that illustrates a high level overview of one embodiment of a method for generating data packets that provide protection against denial of service attacks.

FIG. 3A is a flowchart that illustrates a high level overview of embodiment 310 of a method for generating data packets at a DoS protection sender, which method provides protection against denial of service attacks, according to an embodiment. Though steps are depicted in a particular order in FIG. 3A and subsequent flowcharts, the steps can be performed in a different order or overlapping in time in other embodiments.

In step 302, data is generated for a particular service that consumes considerable computational resources. For example, TCP data and plaintext to be sent to host 110 are encrypted to generate ciphertext. Any method to generate ciphertext that can be decrypted only by a trusted host may be used. In the VPN context, the TCP data and plaintext for host 110 are encrypted using a first secret key shared between gateways 130, 132, and an appropriate encryption mechanism such as DES or Triple DES. In addition, the ciphertext and a second secret key shared between gateways 130, 132 are input to a hashing function to generate a MAC. In some embodiments, the first key and the second key are the same. The ciphertext and MAC are generated in step 302 for a decryption and authentication service represented by decryption services 131 in FIG. 1.

In step 304 a cryptographic DoS Protection (CDP) tag is generated. For example, a CDP independent of the data generated in step 302 is generated to indicate that the data packet is not spurious. By selecting a CDP tag that is independent of the data generated in step 302, data origin authentication can be indicated even though data integrity is not indicated. Data origin authentication is used to reject spurious messages from a DoS attacker. Such data origin authentication can be performed with many fewer computations than are involved in ensuring data integrity, such as in MAC verification. In this context, "data origin authentication" refers to the corroboration that the source of data received is as claimed.

In some embodiments, the CDP tag includes the value of the next number in a sequence of random numbers shared in secret with the receiving gateway 130. For example, Table 1 gives a few random number in a secret sequence shared between gateways 130, 132. In the illustrated example, this shared secret is the third secret shared between the gateways 130, 132; the other secrets are the key for encrypting and decrypting the ciphertext, and the key for verifying the MAC. In other embodiments involving non-cryptographic services, such as embodiments using the ESP-light protocol, this shared secret is the only shared secret.

The more digits in the random number for the CDP tag, the less likely a DoS attacker can guess the next random number in the sequence. In Table 1, it is assumed that the random number is 32 bits; therefore, that random number lies between zero and about 4.29 billion. In some embodiments, an algorithm for generating a sequence of random numbers or pseudo-random numbers from a seed value is agreed upon, and a seed value is shared in secret to generate the same sequence of random numbers at the gateways 130, 132. In some embodiments, a large number of the random numbers are generated and stored in a queue, to save processing time when traffic loads are heavy.

TABLE 1

Example Shared Secret Sequence of Random Numbers

| Order in Sequence | Random Number |
|---|---|
| 1 | 1036298117 |
| 2 | 3855372894 |
| ... | |
| 98 | 3396582937 |
| 99 | 0419785038 |
| ... | |

In some embodiments, the CDP is an encrypted natural sequence number (ESN), encrypted using a secret key shared by gateways 130, 132. For example, Table 2 gives a few natural sequence numbers and hypothetical ESN values generated by encrypting with the secret key. As described above, this shared secret is the third secret shared between the gateways 130, 132; the other secrets are the key for encrypting and decrypting the ciphertext, and the key for verifying the MAC.

In other embodiments involving non-cryptographic services, such as embodiments using the ESP-light protocol, this shared secret is the only shared secret. The more digits in the ESN the less likely a DoS attacker can guess the next random number in the sequence. In Table 2, it is assumed that the ESN is 32 bits; therefore, that ESN lies between zero and about 4.29 billion. In some embodiments, the natural sequence numbers always start at 0 or some other fixed value; in other embodiments, as shown in Table 2, the first number in the natural sequence is a random number.

TABLE 2

Example Shared Secret Encryption of Natural Sequence Numbers

| Natural Sequence Number | Encrypted Sequence Number (ESN) |
|---|---|
| 22298 | 2892384748 |
| 22299 | 0703048701 |
| 22300 | 3374369278 |
| 22301 | 3919282736 |
| 22302 | 2724310400 |
| ... | ... |

To be useful, the computational resources consumed to decrypt the ESN should be much smaller than the resources consumed to perform the computational resource-intensive services. This is demonstrably the case when the computational resource-intensive services include verifying a MAC and the ESN encryption and decryption is performed with a fast 32-bit cipher. For example, verifying a MAC based on the well-known SHA-1 hash function consumes 400 processing cycles on a conventional 32-bit processor for each 20 bytes of message. Therefore a 2,000-kilobyte message consumes 40,000 processing cycles during MAC verification. Decrypting a 32-bit ESN using a SIREN circuit for 32-bit ciphers consumes 50 to 100 processing cycles, a cost savings of 400 to 800 times over MAC verification.

In the above examples, the CDP tag generated in step 304 is independent of the data generated in step 302. In other embodiments, the CDP tag is generated independently of the contents of the data generated in 302, but is generated depending on the amount (or size) of the data generated. For example, a shared secret key is used to encrypt the size (e.g., the number of bits or the number of bytes) of the payload for the particular services generated in step 302. In another example, the size of the payload is added to the natural sequence number described above, before encrypting using the shared secret key. In another example, the encrypted value of the length of the payload is added to the next random number in the secret sequence described above.

In yet another example, the unencrypted value of the length of the payload is added to the next random number in the secret sequence described above. Embodiments that depend on the size of the payload provides some data integrity, but less data integrity than is provided by the MAC. At the same time, such embodiments can be performed with many fewer computations than are involved in producing and verifying the MAC. Embodiments that use the size of the payload are especially useful when the particular services are non-cryptographic services that do not include MAC verification at any stage.

In step 306 a data packet including the data generated in step 302 for the particular services and the CDP generated in step 304 is sent over the public network to the device providing the particular services. For example, a data packet is generated with the ciphertext of the TCP data and the message from host 112 in the encrypted data payload portion 230, and the MAC in the MAC portion 240. In the illustrated embodiment, an ESN from Table 2 is in the CDP tag 250 of the modified ESP header 222 in place of the sequence number field of the conventional ESP header.

The data packet is sent to gateway 130. In some embodiments, the IP destination field 202 includes data indicating the IP address of host 110. In some embodiments, the IP destination field 202 includes data indicating the IP address of gateway 130. In either embodiment, the data packet arrives at gateway 130 if it is not lost on the network 155.

Figure 3B:
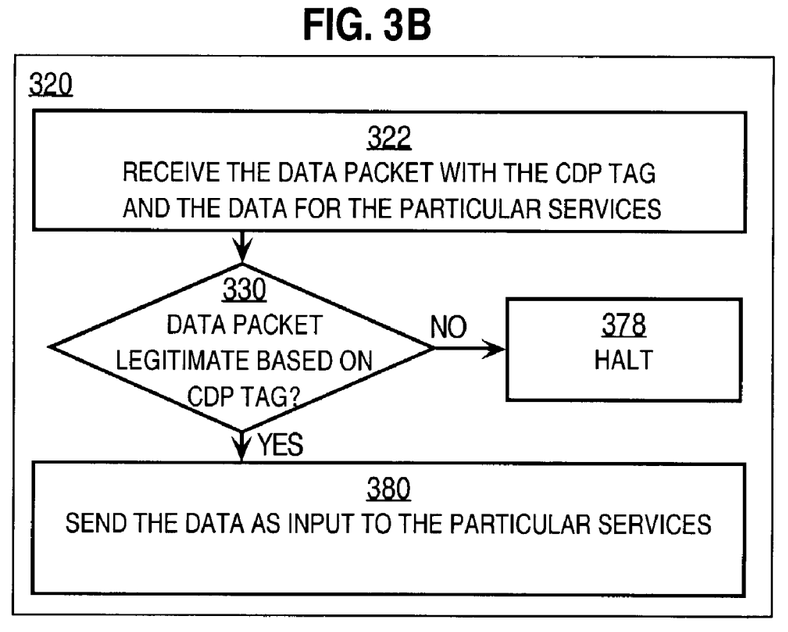
FIG. 3B is a flowchart that illustrates a high level overview of one embodiment of a method for processing received data packets to protect against denial of service attacks.

FIG. 3B is a flowchart that illustrates a high level overview of embodiment 320 of a method for processing received data packets to protect against denial of service attacks.

In step 322, the data packet with the CDP tag and the data for the particular services is received. For example, the received packet includes the ciphertext in portion 230, the MAC in portion 240, and the CDP tag field 250 of the modified ESP header 222. In an illustrated embodiment, the CDP tag holds an ESN from Table 2. In other embodiments, the CDP tag includes an encrypted length of the data for the particular, computational resource-intensive services, such as the ciphertext and MAC in portions 230 and 240. In still other embodiments the CDP tag includes a random number from a secret sequence shared by the gateways 130, 132 or from the one-way function.

In step 330, it is determined whether the data packet is legitimate, based at least in part on the value in the CDP tag. Several embodiments for step 330 are described in more detail below with reference to FIG. 4A, FIG. 4B and FIG. 5.

If it is determined in step 330 that the data packet is not legitimate, then control passes to step 378 to halt processing of the data packet. Therefore the data for the particular services are not processed by the particular services. For example the MAC in portion 240 is not verified and the ciphertext in portion 230 is not decrypted.

If it is determined in step 330 that the data packet is legitimate, control passes to step 380 to send the data to the particular services. Therefore the data for the particular services are processed by the particular services. For example the MAC in portion 240 is verified and, if verified, the ciphertext in portion 230 is decrypted.

Reliable Transport

In a reliable transport protocol, data packets arrive in order, and a sender is asked to retransmit lost data packets. In such embodiments, the test in step 330 is performed by determining whether the CDP tag has a value equal to the next number in the sequence of tags.

To illustrate, it is assumed that the random sequence of Table 1 is used as the CDP tags and a queue of 100 tags is maintained at each gateway 130, 132. A data packet is received at gateway 130 that includes in the CDP tag a value of "1036298117." In step 330 it is determined that this value is on top of the queue, and therefore that the data packet is legitimate. The top value is then removed from the queue, making the random number "3855872894" the top of the queue. In some embodiments the $101^{st}$ random number in the sequence is then added to the end of the queue. Control then passes to step 380 to process the data in the data packet. If the next data packet that arrives has the value 1036298117 again, such as in a tag-capturing attack, that packet is rejected because the value in the CDP tag does not match the new value "3855872894" on the top of the queue.

Assume that the ESN of Table 2 is used as the CDP tags. In some embodiments a queue of 100 tags is maintained at each gateway 130, 132 based on encrypting the 100 numbers in sequence from the agreed starting sequence number, or from the first decrypted number, such as 22298 in Table 2. In other embodiments, the last sequence number is stored in a data structure and the CDP tag is decrypted to generate a sequence number for the data packet. A data packet is received at gateway 130 that includes in the CDP tag a value of "2892384748." In step 330 it is determined that this value decrypts to 22298, the starting natural sequence number, and therefore that the data packet is legitimate. The natural sequence number is incremented, and control then passes to step 380 to process the data in the data packet. If the next data packet that arrives has any value but 0703048701, that packet is rejected because the decrypted value in the CDP tag would not equal 22299, the next number in the natural sequence.

In each of these examples, the attacker has only one chance in $2^{32}$ (over 4.2 billion) to guess the next number, and so is not likely to be able to pass a packet as legitimate. Thus, the data from a spurious message practically never passes to the particular, computational resource-intensive services, such as MAC verification and ciphertext decryption.

Often it is not desirable to perform DoS protection on the application side of a reliable transport protocol. For example, some reliable transport protocols achieve reliability by allocating memory to store data packets in cache until missing data packets, in gaps between received data packets, are received. Such reliable transport protocols are themselves vulnerable to DoS attacks that cause the processes implementing the protocol to consume sufficient available memory that the processes cannot continue. Therefore, it is preferable in many circumstances to perform DoS protection on packets before those packets are processed by the reliable transport layer. Therefore, the CDP processing is often performed on unreliable transport protocols. Important, unreliable transport protocols include IP, the User Datagram Protocol (UDP) and the Real-time Transport Protocol (RTP).

Unreliable Transport

In an unreliable transport protocol, data packets arrive out of order and lost data packets are not necessarily retransmitted. In such embodiments, the test in step 330 is performed by determining whether the CDP tag provides a value that is a reasonable next number in the sequence of tags. A reasonable next number can precede the last number in the sequence by a small amount or can surpass the last number by a small amount. If a large number of packets are lost, however, the method must be able to recover and establish a number in the new series of packets as a reasonable next number.

According to these embodiments, the most recently received plaintext value of a tag, represented by the symbol S, is determined to be reasonable based on comparing S to a partial list of plaintext numbers in the sequence already received and already considered to be legitimate. The legitimate, received plaintext number that is furthest in the sequence is called the largest, or maximum, legitimate sequence number, and is represented for convenience by the symbol Lmax.

Figure 4:
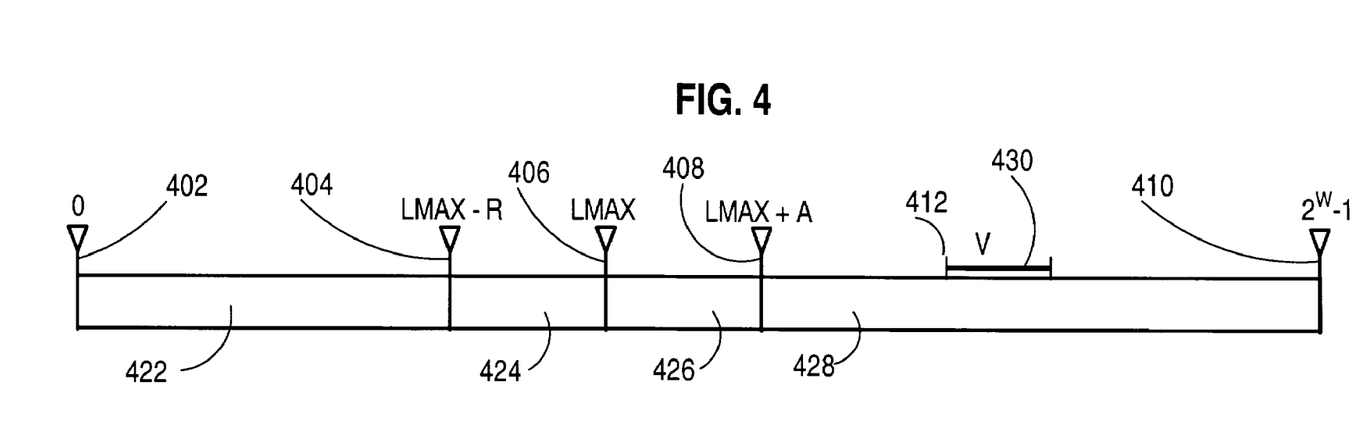
FIG. 4 is a block diagram illustrating ranges of a plaintext sequence number used to determine whether a received plaintext sequence number is a reasonable next sequence number.

FIG. 4 is a block diagram illustrating ranges of plaintext sequence numbers used to determine whether a plaintext sequence number S based on a just received CDP tag is a reasonable next sequence number, according to an embodiment. For a CDP tag made up of W bits, the range of natural sequence numbers that can be represented has $2^W$ members, from 0 represented in FIG. 4 by position 402 through $2^W-1$ at position 410. Lmax is at position 406. Other positions and intervals depicted in FIG. 4 are described in the following paragraphs.

The partial list of plaintext numbers in the sequence already received and already considered to be legitimate is called a replay list because it is used to determine whether the value S just received in the CDP tag has already been received, as would be expected in a tag-capturing attack. The replay list is kept manageable by keeping just the list of legitimate, received sequence numbers that are within a replay interval R of the maximum legitimate sequence number, Lmax. In FIG. 4, the replay list includes the interval 424 from the position 404 of the value Lmax−R to the position 406 of the value Lmax. If the most recently received plaintext value, S, precedes the replay interval 424, the value S is considered an unreasonable next number and the packet is considered illegitimate. For example, if the value of S falls in the interval 422, the value is considered unreasonable and the data packet is determined to be illegitimate.

The replay list is stored in a data structure for reference. In some embodiments the replay list is a bitmap with R+1 bits. Each bit represents a position in the sequence from Lmax−R to Lmax. A value of one in a bit indicates that the number in that position of the sequence has already been received. A value of zero in a bit indicates that the number in that position of the sequence has not already been received. By definition, the bit corresponding to the position Lmax has a value of one.

If the plaintext value S falls in the replay interval 424 at a position corresponding to a value not already received and considered reasonable, then the value of S is reasonable, and the data packet is considered legitimate. For example, if the plaintext value S falls in the replay interval 424 at a position corresponding to a bit having a value of zero, then S is considered a reasonable next number, and the data packet is considered legitimate. The corresponding bit is reset to a value of one. If the plaintext value S falls in the replay interval 424 at a position corresponding to a value already received and considered reasonable, then the CDP tag is a repeat, the value of S is not reasonable, and the data packet is illegitimate. For example, if the plaintext value S falls in the replay interval 424 at a position corresponding to a bit having a value of one, then the value of S is considered not reasonable, and the data packet is considered illegitimate.

If the plaintext value S exceeds Lmax by less than an automatic acceptance interval, represented by the symbol A, then S is automatically accepted as reasonable, and the data packet is considered legitimate. For example, if the value of S lies in the interval 426 from the position 406 of the value of Lmax to the position 408 of the value of Lmax+A, then S is automatically accepted as reasonable. Lmax is then reset to equal S, and the replay list is shifted to the interval R less than the reset Lmax.

If the value just received, S, exceeds Lmax by more than A, then the value of S is considered unreasonable unless there is some indication that a legitimate sequence is being established after an extended loss of data packets. For example, if the value of S lies in the interval 428 from position 408 of the value Lmax+A to the position 410 of the value $2^W-1$, then S is unreasonable unless such an indication is found. Tests are performed to determine whether a sequence is likely to be legitimate after a data loss, as described in more detail below. Some tests involve a cluster of plaintext values found in an interval 430 of width V from a cluster start position 412.

Figure 5A:
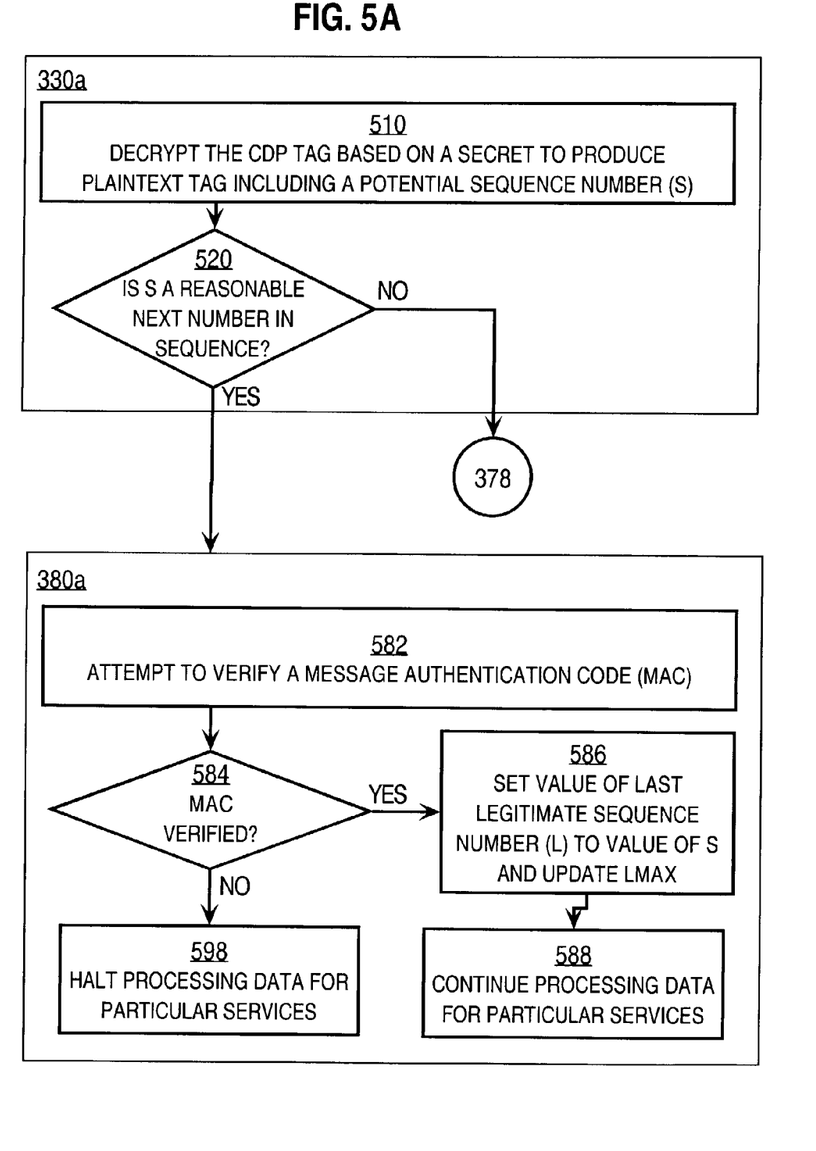
FIG. 5A is a flowchart that illustrates details of steps in the method depicted in FIG. 3B.

FIG. 5A is a flowchart that illustrates embodiments 330a and 380a of steps 330 and 380 in the method depicted in FIG. 3B. Embodiment 330a is useful with unreliable transport protocols. Embodiment 380a is useful when the data for the particular services include MAC verification, as is common in cryptographic protocols like ESP.

In step 510, the CDP tag is decrypted based on the shared secret to produce a plaintext tag that includes a potential sequence number S. For example, using the tags of Table 2, above, the CDP tag value "0703048701" is decrypted using the secret key shared by gateways 130, 132 to produce a value of 22299 for the potential next natural sequence number S. In embodiments that use a secret sequence of random numbers, decrypting the CDP tag is considered to mean associating the sequence order position in the queue with the random number. For example, in the queue of random numbers indicated in Table 1, the random number "3855372894" is associated with the order position 2 and the random number "3396582937" is associated with the order position 98. Therefore, in the embodiment using Table 1, the value of S would be 2 or 98, respectively. In some embodiments that use a random number S0 for the start of the natural sequence numbers, the value of S is determined by subtracting S0 from the decrypted value of the ESN so that the series of S values begin at 0. For example, the value 22298 is subtracted from the decrypted ESN values listed in Table 2. If a negative value results after S0 is subtracted, the value of $2^W$ is added to the result to keep the series of S values ever increasing.

In step 520, it is determined whether the value of S is reasonable as the next number in the sequence. More details on step 520 are provided in FIG. 5B. If it is determined in step 520 that the value of S is not reasonable as the next number in the sequence, then control passes to step 378 to halt processing of the data packet, as described above. If it is determined in step 520 that the value of S is reasonable as the next number in the sequence, then control passes to step 380 to continue processing the data packet.

Embodiment 380a of step 380 is described in more detail below. Embodiment 380a is utilized for cryptographic services that include MAC verification.

For embodiments that include a MAC, MAC verification can be utilized to determine whether a data packet is legitimate after an arbitrary loss of data packets. Data packets received after an arbitrarily long loss of data packets fall in interval 428. To assure that legitimate data packets that fall in range 428 are eventually recognized, MAC verification can be performed. However, performing MAC verification on every packet that falls in range 428 provides little protection against DoS attacks because an attacker has a good chance of guessing an encrypted number that has a plaintext value S in the range 428. Therefore, according to an illustrated embodiment, one data packet in $2^D$ data packets is sent forward for processing by the cryptographic services including MAC verification.

The value of D is selected to provide desired performance properties. For example, after a loss of B data packets, it is desired to detect a legitimate data packet after receipt of about a hundred legitimate packets, on average. Then D is selected to be 6, so that there is one change in 64 that a data packet is sent forward for MAC verification. Therefore, when a legitimate data packet in the range 428 is received, there is one chance in 64 that the packet will be found during MAC verification. In the presence of a DoS attack, most data packets are illegitimate packets, so most of the skipped packets are illegitimate packets. Thus sending forward one packet in 64 saves the gateway device 130 from processing almost 63 times as many illegitimate packets.

In step 582, an attempt is made to verify a MAC in a data packet found to be reasonable in step 520. In step 584 it is determined whether the MAC is verified. If not, control passes to step 598. In step 598 further processing by the cryptographic services is halted. For example, the ciphertext of the TCP data and message from host 112 in portion 230 of the data packet is not decrypted.

If it is determined in step 584 that the MAC is verified, then control passes to step 586 to update the replay list and Lmax. If the replay list has already been updated during step 520, then no further action is required and control passes to step 588. In step 588, processing the data for the cryptographic services continues. For example, the ciphertext of the TCP data and message from host 112 in portion 230 of the data packet is decrypted.

However, if the data packet was passed to step 380a by virtue of being the one packet in $2^D$ packets, then the replay list is not up-to-date. In the illustrated embodiment, updating the replay list includes the following steps. It is determined whether S lies in the replay interval 424; and, if so, the value of S is added to the replay list, such as by setting the bit associated with the position of S to the value of one. If S is not in the replay interval 424, then it is determined whether S is greater than Lmax; and, if so, the value of Lmax is reset to the value of S. The value of Lmax is set to S, even if S falls in the range 428 above the automatic acceptance interval, because the MAC has been verified and therefore the value of S is reasonable by definition. The replay list is shifted to end at the new Lmax. Control then passes to step 588 to continue processing the data for the cryptographic services.

In some embodiments involving MAC verification, the replay list is not maintained or updated, and Lmax is always reset to the value of S during step 586.

Figure 5B:
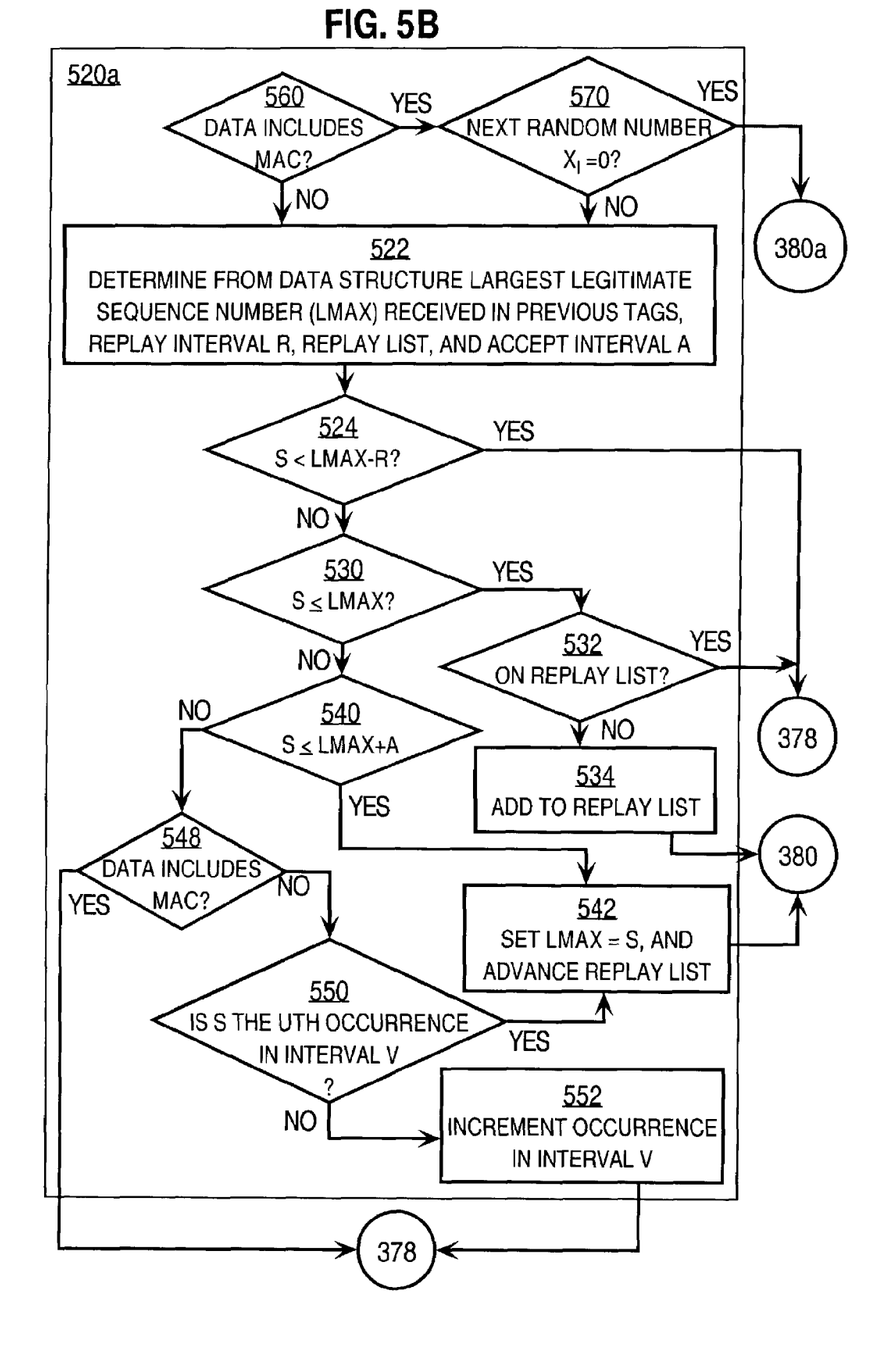
FIG. 5B is a flowchart that illustrates details of a step in the method depicted in FIG. 5A.

FIG. 5B is a flowchart that illustrates embodiment 520a of step 520 in the method depicted in FIG. 5A. The processing in step 520a depends on whether the data for the particular, computational resource-intensive services includes MAC verification. This dependence is depicted in FIG. 5B as decision points 560, 548. It is expected that, in practice, the processing depicted in step 520 is implemented in embodiments either for cryptographic services whose data includes a MAC or for non-cryptographic services whose data does not include a MAC, but not both. Such embodiments do not explicitly include instructions that perform the decision points 560, 548. Embodiments for the cryptographic services include the steps in FIG. 5B following the "YES" branches of the decision points 560, 548. Embodiments for the non-cryptographic services include the steps in FIG. 5B following the "NO" branches of the decision points 560, 548.

In step 560 it is determined whether the data for the particular services include a MAC. If so, then control passes to step 570. If not, then control passes to step 522.

In step 570 it is determined whether a low probability event having one chance in $2^D$ has occurred. For example, in an illustrated embodiment, a series of random or pseudo-random numbers Xi having D bits is generated. With each new data packet received, the value of i is incremented and the next random number Xi is obtained. The probability that Xi equals any particular value is then one in $2^D$. In the illustrated embodiment step 570 comprises the step of determining whether Xi equals zero. If so, the value of S is considered reasonable automatically and the data packet is passed to step 380a to verify the MAC, as described above. If Xi is not equal to zero, control passes to step 522.

In step 522, the values of the replay interval R, the automatic acceptance interval A, Lmax, and the replay list are retrieved from one or more data structures where they are stored. In some embodiments, R is always equal to A; and a single value R is retrieved from the data structures in lieu of the two values R and A. It is noted that for embodiments using a secret sequence of random numbers, the number of random number that should be kept in the queue is at least the sum of R and A. Then, if the random number is in an acceptable range, it is in the queue.

For purposes of illustration, it is assumed that the services are cryptographic services including MAC verification, that the CDP tag is an ESN as depicted in Table 2, above, that R and A each equals 15, that Lmax is 22300, and that the replay bitmap is "1110110111010001".

In step 524 it is determined whether the value of S is below the replay interval in range 422. For example, it is determined whether the value of S is less than Lmax−R=22284. If so, the value of S is not reasonable, and the data packet is illegitimate. Control passes to step 378, described above, to halt processing. If not, control passes to step 530. For example, if S has a value of 23295, control passes to step 530.

In step 530 it is determined whether the value of S is within the replay interval in range 422. For example, it is determined whether the value of S, already known to be greater than Lmax−R by virtue of step 524, is less than or equal to Lmax=22300. If not, control passes to step 540, described below. If so, the value of S may be reasonable, and the data packet may be legitimate, if the value is not a repeat of a value already received. Control passes to step 532 to determine if the value of S is on the replay list. For example, if S=23295, then S is less than 22300 and control passes to step 532.

In some embodiments in which the data for the cryptographic services includes a MAC and a replay list is not maintained, steps 532 and 534, described below, are omitted and control passes directly to step 380a to verify the MAC and update Lmax, as described above with reference to steps 584 and 586.

In step 532 it is determined whether the value of S is already on the replay list. For example the replay bitmap is employed to determine if the value of S has already been received. It is determined that the difference between Lmax and S is 5, so that the value of S is represented by the $5^{th}$ bit to the left of the end bit, i.e., the $6^{th}$ bit from the right, in the replay list bitmap "1110110111010001". The $6^{th}$ bit has a value of 0, indicating the value of S is not on the replay list and has not been received already. If it is determined in step 532 that the value of S is already on the replay list, control passes to step 378 to halt processing. If it is determined in step 532 that the value of S is not already on the replay list, control passes to step 534 to add the value to the replay list, and then passes to step 380 to continue processing the data for the particular services. For example, when S equals 23295, control passes to step 534 to reset the 6$^{th}$ bit from the right to 1, causing the replay bitmap to take the value "1110110111110001". Control then passes to step 380 to continue processing.

In step 540 it is determined whether the value of S is within the automatic acceptance interval in range 426. For example, it is determined whether the value of S, already known to be greater than Lmax by virtue of step 530, is less than or equal to Lmax+A=22315. If not, the value of S is in the range 428; and S is considered an "outlier." An outlier may indicate a loss of data packets and control passes to step 548, described below. If the value of S is within the automatic acceptance interval in range 426, the value of S is considered reasonable, and the data packet is considered legitimate. Control passes to step 542 to reset Lmax and the replay list. For example, if S=22306, then S is less than 22315 and control passes to step 542.

In some embodiments in which the data for the cryptographic services includes a MAC and a replay list is not maintained in the DoS protection component, step 542 is omitted and control passes directly to step 380a to verify the MAC and update Lmax, as described above with reference to steps 584 and 586.

In step 542 Lmax is set to S and the replay list is advanced. For example, Lmax is reset to 22306. The reset Lmax (22306) is greater than the previous Lmax (22300) by 6, so the replay bitmap is advanced by adding 6 positions to the new end of the replay list and removing 6 positions from the old end of the replay list. Thus the replay bitmap is advanced by deleting six bits from the left of the bitmap and adding six bits having value of "000001" to the right of the bitmap. The resulting updated replay bitmap has the value "0111010001000001". Control passes to step 380 to continue processing the data for the particular services.

In step 548, it is determined whether the data for the particular services includes a MAC. If so, then recovery from loss of data packets relies on the data packets sent to step 380a upon the occurrence of the low probability event determined in step 570; and no further processing is performed here. Control passes to step 378 to halt further processing of the data for the cryptographic services. If the data for the particular services does not include a MAC, then control passes to step 550 and following steps to determine if the outlier indicates that a cluster of legitimate packets is being received after a long burst of lost packets.

In step 550 it is determined whether the values of S in the range 428 of outliers demonstrate a cluster of closely spaced sequence numbers. A cluster of closely spaced sequence numbers is expected in a series of legitimate data packets received after a long burst of lost data packets. Any method can be used to perform this step.

In illustrated embodiments, the step is performed using few computational resources. An interval size V is defined that indicates the largest range of values considered to be in a single cluster; and a minimum number U (less than V) is defined that indicates how many outliers should occur in an interval of size V to be considered a cluster of legitimate data packets instead of a DoS attack. A counter is defined that is set to zero. The chances of an attacker guessing a W-bit CDP tag that produces a value of S in any interval of size V is $V*2^{-W}$. The chance of guessing U values in the same interval before producing a value outside the interval is about $V*2^{-WU}$. However, legitimate data packets are likely to have many successive values of S lie in the same interval V. In the illustrated embodiments, step 550 comprises determining whether the outlier S is the Uth occurrence of an outlier in a particular interval of width V before the occurrence of an outlier outside that interval.

U and V are selected so that the probability of an attacker guessing U values that fall within a range V is impractically small, while the chances that legitimate data packets fall in the rang is acceptably high. For example, V is selected to be 16 and U is selected to be 3.

According to illustrated embodiments, the first value of S found in the outlier region 428 is used to define an interval 430 that starts at position 412 and has width V, as shown in FIG. 4. For example, in one embodiment the start position 412 is taken equal to S. In another embodiment, the value of S is placed in the middle of the interval, so that start position 412 is equal to the value of (S-V/2). Assuming, for purposes of illustration, that S is equal to 22400 in the latter embodiment, the interval 430 is defined as the interval of length 16 starting at 22392. Note that the first outlier is used to define the interval and is not considered among the U occurrences in the same interval that yield the probability $2^{-WU}$.

The next outlier value for S is then compared to start position 412. If the difference between the next outlier value and the midpoint of the interval 430 is greater than V/2, a new interval with a new start position is determined based on the next outlier value and the counter is reset. Control passes to step 552 to increment the counter and then to step 378 to halt processing of the data in the data packet for the particular services. For example, if the value of the next outlier is 22350, the interval is reset to start at 22342 and the counter is reset to −1 so that, after incrementing in step 552, the counter has a value of 0.

If the difference between the next outlier value and the midpoint of the interval 430 is less than or equal to V/2, the counter is checked. For example, if the value of the next outlier is 22399, the counter is checked.

If the value of the counter is less than U-1, the value of S is not likely to have originated from the legitimate sender. Control passes to step 552 to increment the counter and then to step 378 to halt processing of the data for the particular services. For example, if the value of the counter is 0, control passes to step 522 to increment the counter to a value of 1 and then to step 378.

If the value of the counter equals U−1, then this value of S is the Uth consecutive outlier in the interval 430 after the interval is defined. Consequently, the value of S is likely to have originated from the legitimate sender and the data packet is considered legitimate. The counter is reset to zero and control passes to step 542 to reset the value of Lmax and advance the replay list. For example, if the counter has a value of 2, then the current outlier is the 3$^{rd}$ consecutive outlier in the interval 430. The counter is reset to zero; and control passes to step 542.

Using the techniques described herein with reference to FIG. 4, FIG. 5A and FIG. 5B, protection against DoS attacks on devices providing computational resource-intensive services is provided for unreliable transport protocols such as IP, UDP and RTP. Specific embodiments are provided that operate with cryptographic services that perform MAC verification using a modified ESP protocol, and with non-cryptographic services using an ESP-light protocol.

Hardware Overview

Figure 6:
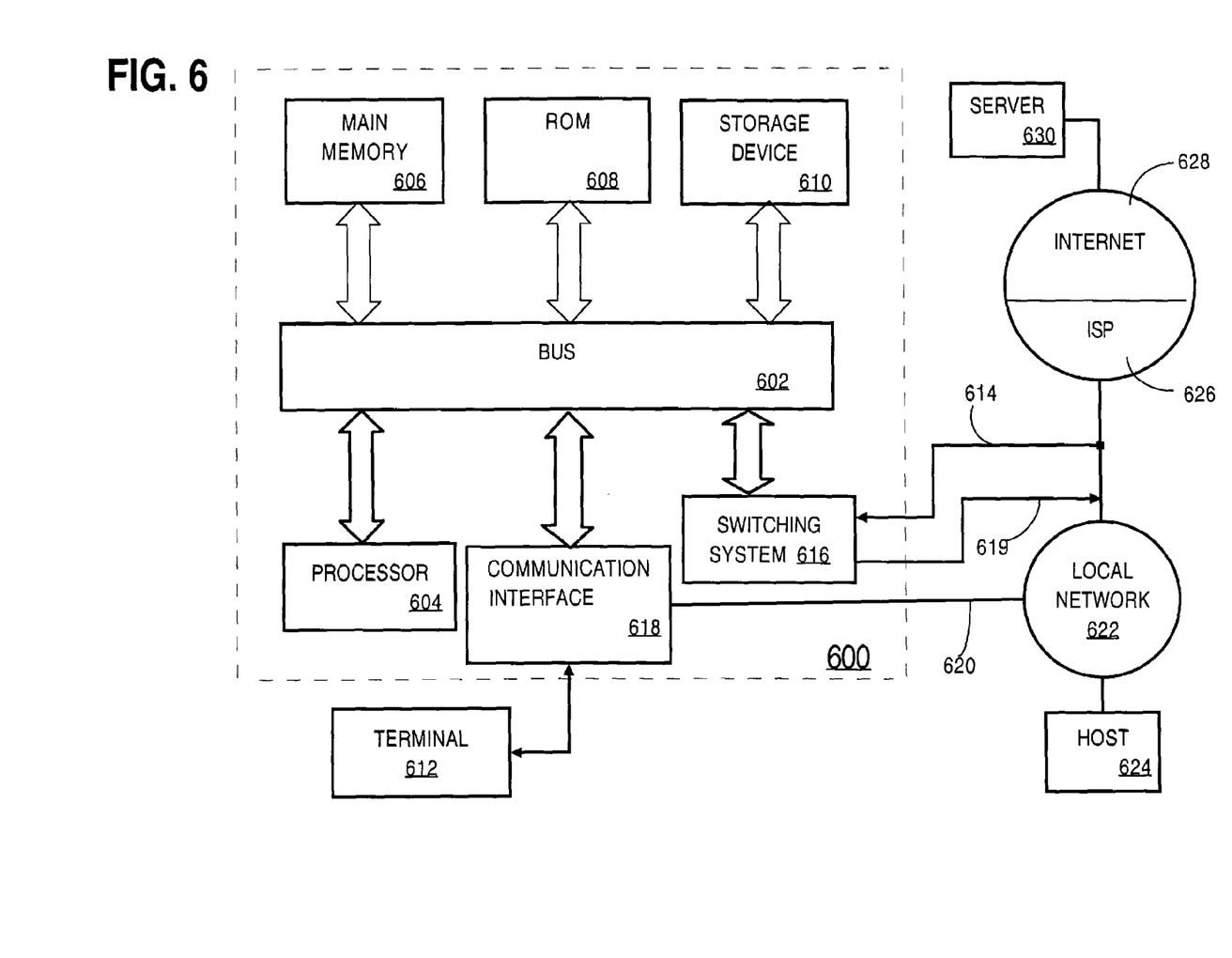
FIG. 6 is a block diagram that illustrates a computer system upon which an embodiment may be implemented.

FIG. 6 is a block diagram that illustrates a computer system 600 upon which an embodiment of the invention may be implemented. The preferred embodiment is implemented using one or more computer programs or application specific integrated circuits on a network element such as a router device. Thus, in this embodiment, the computer system 600 is a router.

Computer system 600 includes a bus 602 or other communication mechanism for communicating information, and a processor 604 coupled with bus 602 for processing information. Computer system 600 also includes a main memory 606, such as a random access memory (RAM), flash memory, or other dynamic storage device, coupled to bus 602 for storing information and instructions to be executed by processor 604. Main memory 606 also may be used for storing temporary variables or other intermediate information during execution of instructions to be executed by processor 604. Computer system 600 further includes a read only memory (ROM) 608 or other static storage device coupled to bus 602 for storing static information and instructions for processor 604. A storage device 610, such as a magnetic disk, flash memory or optical disk, is provided and coupled to bus 602 for storing information and instructions.

A communication interface 618 may be coupled to bus 602 for communicating information and command selections to processor 604. In some embodiments, interface 618 is a conventional serial interface such as an RS-232 or RS-422 interface. An external terminal 612 or other computer system connects to the computer system 600 and provides commands to it using the interface 618. Firmware or software running in the computer system 600 provides a terminal interface or character-based command interface so that external commands can be given to the computer system.

A switching system 616 is coupled to bus 602 and has an input interface 614 and an output interface 619 to one or more external network elements. The external network elements may include a local network 622 coupled to one or more hosts 624, or a global network such as Internet 628 having one or more servers 630. The switching system 616 switches information traffic arriving on input interface 614 to output interface 619 according to pre-determined protocols and conventions that are well known. For example, switching system 616, in cooperation with processor 604, can determine a destination of a packet of data arriving on input interface 614 and send it to the correct destination using output interface 619. The destinations may include host 624, server 630, other end stations, or other routing and switching devices in local network 622 or Internet 628.

The invention is related to the use of computer system 600 for protecting a device from DoS attacks. According to one embodiment of the invention, DoS protection is provided by computer system 600 in response to processor 604 executing one or more sequences of one or more instructions contained in main memory 606. Such instructions may be read into main memory 606 from another computer-readable medium, such as storage device 610. Execution of the sequences of instructions contained in main memory 606 causes processor 604 to perform the process steps described herein. One or more processors in a multi-processing arrangement may also be employed to execute the sequences of instructions contained in main memory 606. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 604 for execution. Such a medium may take many forms, including but not limited to, non-volatile media, volatile media, and transmission media. Non-volatile media includes, for example, optical or magnetic disks, such as storage device 610. Volatile media includes dynamic memory, such as main memory 606. Transmission media includes coaxial cables, copper wire and fiber optics, including the wires that comprise bus 602. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 604 for execution. For example, the instructions may initially be carried on a magnetic disk of a remote computer. The remote computer can load the instructions into its dynamic memory and send the instructions over a telephone line using a modem. A modem local to computer system 600 can receive the data on the telephone line and use an infrared transmitter to convert the data to an infrared signal. An infrared detector coupled to bus 602 can receive the data carried in the infrared signal and place the data on bus 602. Bus 602 carries the data to main memory 606, from which processor 604 retrieves and executes the instructions. The instructions received by main memory 606 may optionally be stored on storage device 610 either before or after execution by processor 604.

Communication interface 618 also provides a two-way data communication coupling to a network link 620 that is connected to a local network 622. For example, communication interface 618 may be an integrated services digital network (ISDN) card or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the worldwide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are exemplary forms of carrier waves transporting the information.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618. In accordance with the invention, one such downloaded application provides for XXX as described herein.

The received code may be executed by processor 604 as it is received, and/or stored in storage device 610, or other non-volatile storage for later execution. In this manner, computer system 600 may obtain application code in the form of a carrier wave.

Extensions and Alternatives

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method for protecting, from denial of service attacks initiated through a communication network, a device that provides particular services, the method comprising the computer-implemented steps of:
   receiving a data packet that includes data purportedly associated with the particular services and a cryptographic tag;
   determining whether the data packet is legitimately associated with the particular services, based on the cryptographic tag without using the data for the particular services; and
   if it is determined that the data packet is not legitimate, then diverting the data from input to the particular services that process the data.

2. The method of claim 1, further comprising, if it is determined that the data packet is legitimate, then performing the step of sending the data as input to the particular services that process the data.

3. The method of claim 1, wherein:
   the particular services are cryptographic services that process encrypted data; and
   the data for the particular services is encrypted data.

4. The method of claim 1, said step of determining whether the data packet is legitimate comprising the step of determining whether the cryptographic tag includes data indicating a number in a sequence of unpredictable numbers.

5. The method of claim 4, further comprising sharing the sequence of unpredictable numbers in secret with a sending device that sends legitimate data packets.

6. The method of claim 4, further comprising sharing with a plurality of receiving devices a function that verifies the sequence of unpredictable numbers but does not generate the sequence.

7. The method of claim 4, wherein:
   a network transport protocol ensures that data packets are received in the same order in which the data packets are sent without data loss; and
   said step of determining whether the data packet is legitimate further comprises determining whether the cryptographic tag includes data indicating a next number in the sequence of unpredictable numbers.

8. The method of claim 2, wherein:
   the data for the particular services includes a message authentication code; and
   said step of sending the data as input to the particular services further comprises verifying the message authentication code within the particular services.

9. The method of claim 1, said step of determining whether the data packet is legitimate comprising the steps of:
   decrypting the cryptographic tag without using the data for the particular services to determine a plaintext tag; and
   determining whether the data packet is legitimate based on the plaintext tag.

10. The method of claim 9, wherein:
    a network transport protocol ensures that data packets are received in the same order in which the data packets are sent without data loss; and
    said step of determining whether the data packet is legitimate based on the plaintext tag comprises the step of determining whether the plaintext tag includes data indicating the next number in a natural sequence of numbers.

11. The method of claim 9, said step of determining whether the data packet is legitimate based on the plaintext tag comprising the step of determining whether the plaintext tag includes data indicating a first number that is a reasonable next number in a natural sequence of numbers.

12. The method of claim 11, further comprising, if it is determined that the first number is a reasonable next number, then performing the step of storing the first number in a set of stored numbers that were included in previous plaintext tags and determined to be reasonable next numbers.

13. The method of claim 11, said step of determining whether the plaintext tag includes data indicating a first number that is a reasonable next number comprising the step of determining whether the first number is not a duplicate of any stored number in a set of stored numbers that were included in previous plaintext tags and determined to be reasonable next numbers.

14. The method of claim 11, said step of determining whether the plaintext tag includes data indicating a reasonable next number comprising the step of determining whether such data does not surpass, by more than a specified difference value, a largest number determined to be reasonable in a previous plaintext tag.

15. The method of claim 14, said step of determining whether the plaintext tag includes data a reasonable next number further comprising, if it is determined that such data does surpass the largest number determined to be reasonable by more than the specified difference value, then performing the step of determining whether such data forms a cluster with other numbers that surpassed the largest number determined to be reasonable.

16. The method of claim 15, further comprising, if it is determined that the first number forms a cluster with other numbers that surpassed the largest number determined to be reasonable, then setting a value of the largest number determined to be reasonable to a value of the first number.

17. The method of claim 15, said step of determining whether the first number forms a cluster with other numbers that surpassed the largest number determined to be reasonable further comprising the step of determining whether a value of the first number and values of a particular amount of the other numbers lie within a particular range of values.

18. The method of claim 11, further comprising, if it is determined that the data packet is legitimate based on the plaintext tag, then performing the steps of:

determining a largest legitimate number among the first number and a set of stored numbers determined to be reasonable next numbers for previous plaintext tags; and storing in the set of stored numbers only numbers determined to be reasonable next numbers that are within a particular difference from the largest legitimate number.

19. The method of claim 11, further comprising, if it is determined that the first number is a reasonable next number, then performing the steps of:

determining a set of stored numbers that were included in previous plaintext tags and determined to be reasonable next numbers; and storing in the set of stored numbers only numbers determined to be reasonable next numbers that are within a particular difference from the first number.

20. The method of claim 1, wherein:

the data for the particular services includes a message authentication code; and said step of determining whether the data packet is legitimate comprises the step of determining whether a low probability event has occurred, wherein the low probability event occurs infrequently enough that the computational cost of assuming that the data packet is legitimate is acceptable.

21. The method of claim 20, further comprising, if it is determined that the data packet is legitimate, then performing the steps of:

sending the data as input to the particular services that process the data, comprising determining whether the message authentication code is verified;

decrypting the cryptographic tag without using the data for the particular services to determine a plaintext tag including data indicating a first number; and if the message authentication code is verified, then determining that the first number is a reasonable next number in a natural sequence of numbers.

22. A computer-readable medium carrying one or more sequences of instructions for protecting from denial of service attacks a device that provides particular services, wherein execution of the one or more sequences of instructions by one or more processors causes the one or more processors to perform the steps of:

receiving a data packet that includes data for the particular services and a cryptographic tag;

determining whether the data packet is legitimate based on the cryptographic tag without using the data for the particular services; and if it is determined that the data packet is not legitimate, then diverting the data from input to the particular services that process the data.

23. An apparatus for protecting from denial of service attacks a device that provides particular services, comprising:

means for receiving a data packet that includes data for the particular services and a cryptographic tag;

means for determining whether the data packet is legitimate based on the cryptographic tag without using the data for the particular services; and means for diverting the data from input to the particular services that process the data, if it is determined that the data packet is not legitimate.

24. An apparatus for protecting from denial of service attacks a device that provides particular services, comprising:

a network interface that is coupled to a data network for receiving one or more packet flows therefrom;

a processor;

a computer-readable medium coupled to the processor and comprising one or more sequences of instructions which, when executed by the processor, cause the processor to carry out the steps of:

receiving a data packet that includes data for the particular services and a cryptographic tag;

determining whether the data packet is legitimate based on the cryptographic tag without using the data for the particular services; and if it is determined that the data packet is not legitimate, then diverting the data from input to the particular services that process the data.

25. The apparatus of claim 24, further comprising sequences of instructions which, when executed by the processor, cause the processor to perform the step of performing the step of sending the data as input to the particular services that process the data if it is determined that the data packet is legitimate.

26. The apparatus of claim 25, wherein:

the data for the particular services includes a message authentication code; and further comprising sequences of instructions which, when executed by the processor, cause the processor to perform the step of verifying the message authentication code within the particular services.

27. The apparatus of claim 24, wherein:

the particular services are cryptographic services that process encrypted data; and the data for the particular services is encrypted data.

28. The apparatus of claim 24, comprising sequences of instructions which, when executed by the processor, cause the processor to perform the step of determining whether the cryptographic tag includes data indicating a number in a sequence of unpredictable numbers.

29. The apparatus of claim 28, further comprising sequences of instructions which, when executed by the processor, cause the processor to perform the step of sharing with a plurality of receiving devices a function that verifies the sequence of unpredictable numbers but does not generate the sequence.

30. The apparatus of claim 28, further comprising logic implementing:

a network transport protocol that ensures that data packets are received in the same order in which the data packets are sent without data loss; and further comprising sequences of instructions which, when executed by the processor, cause the processor to perform the step of determining whether the cryptographic tag includes data indicating a next number in the sequence of unpredictable numbers.

31. The apparatus of claim 28, further comprising sequences of instructions which, when executed by the processor, cause the processor to perform the step of sharing the sequence of unpredictable numbers in secret with a sending device that sends legitimate data packets.

32. The apparatus of claim 24, comprising sequences of instructions which, when executed by the processor, cause the processor to perform the steps of:

decrypting the cryptographic tag without using the data for the particular services to determine a plaintext tag; and determining whether the data packet is legitimate based on the plaintext tag.

33. The apparatus of claim 32, further comprising logic implementing:
- a network transport protocol that ensures that data packets are received in the same order in which the data packets are sent without data loss; and
- sequences of instructions which, when executed by the processor, cause the processor to perform the step of determining whether the plaintext tag includes data indicating the next number in a natural sequence of numbers.

34. The apparatus of claim 32, sequences of instructions which, when executed by the processor, cause the processor to perform the step of determining whether the plaintext tag includes data indicating a first number that is a reasonable next number in a natural sequence of numbers.

35. The apparatus of claim 34, further comprising sequences of instructions which, when executed by the processor, cause the processor to perform storing the first number in a set of stored numbers that were included in previous plaintext tags and determined to be reasonable next numbers, if it is determined that the first number is a reasonable next number.

36. The apparatus of claim 34, comprising sequences of instructions which, when executed by the processor, cause the processor to perform the step of determining whether the first number is not a duplicate of any stored number in a set of stored numbers that were included in previous plaintext tags and determined to be reasonable next numbers.

37. The apparatus of claim 34, comprising sequences of instructions which, when executed by the processor, cause the processor to perform the step of determining whether such data does not surpass, by more than a specified difference value, a largest number determined to be reasonable in a previous plaintext tag.

38. The apparatus of claim 37, further comprising sequences of instructions which, when executed by the processor, cause the processor to perform the step of determining whether such data forms a cluster with other numbers that surpassed the largest number determined to be reasonable, if it is determined that such data does surpass the largest number determined to be reasonable by more than the specified difference value.

39. The apparatus of claim 38, further comprising sequences of instructions which, when executed by the processor, cause the processor to perform the step of setting a value of the largest number determined to be reasonable to a value of the first number, if it is determined that the first number forms a cluster with other numbers that surpassed the largest number determined to be reasonable.

40. The apparatus of claim 38, comprising sequences of instructions which, when executed by the processor, cause the processor to perform the step of determining whether a value of the first number and values of a particular amount of the other numbers lie within a particular range of values.

41. The apparatus of claim 34, further comprising sequences of instructions which, when executed by the processor, cause the processor to perform the steps of:
- determining a largest legitimate number among the first number and a set of stored numbers determined to be reasonable next numbers for previous plaintext tags; and
- storing in the set of stored numbers only numbers determined to be reasonable next numbers that are within a particular difference from the largest legitimate number, if it is determined that the data packet is legitimate based on the plaintext tag.

42. The apparatus of claim 34, further comprising sequences of instructions which, when executed by the processor, cause the processor to perform the steps of:
- determining a set of stored numbers that were included in previous plaintext tags and determined to be reasonable next numbers; and
- storing in the set of stored numbers only numbers determined to be reasonable next numbers that are within a particular difference from the first number, if it is determined that the first number is a reasonable next number.

43. The apparatus of claim 24, wherein:
- the data for the particular services includes a message authentication code; and
- comprising sequences of instructions which, when executed by the processor, cause the processor to perform the step of determining whether a low probability event has occurred, wherein low probability means infrequently enough that a computational cost of assuming that the data packet is legitimate is acceptable.

44. The apparatus of claim 43, further comprising sequences of instructions which, when executed by the processor, cause the processor to perform the steps of: sending the data as input to the particular services that process the data, comprising
- determining whether the message authentication code is verified; decrypting the cryptographic tag without using the data for the particular services to
- determine a plaintext tag including data indicating a first number; and
- if the message authentication code is verified, then determining that the first number is a reasonable next number in a natural sequence of numbers, if it is determined that the data packet is legitimate.

* * * * *